United States Patent
Kobayashi et al.

(10) Patent No.: US 6,936,940 B2
(45) Date of Patent: Aug. 30, 2005

(54) MOTOR WITH RESIN BASE PLATE

(75) Inventors: Kazutaka Kobayashi, Nagano (JP); Makoto Akabane, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/426,896

(22) Filed: Apr. 29, 2003

(65) Prior Publication Data

US 2004/0000828 A1 Jan. 1, 2004

(30) Foreign Application Priority Data

Apr. 30, 2002 (JP) ........................ 2002-128022
Apr. 30, 2002 (JP) ........................ 2002-128025
Apr. 30, 2002 (JP) ........................ 2002-128034

(51) Int. Cl.[7] .............................................. H02K 5/22
(52) U.S. Cl. ..................... 310/67 R; 310/71; 360/99.08
(58) Field of Search .................... 360/99.03, 99.04, 360/99.08, 99.09; 310/43, 67 R, 71, 89

(56) References Cited

U.S. PATENT DOCUMENTS 6,188,155 B1 * 2/2001 Ishizuka et al. .............. 310/71
6,479,914 B2 * 11/2002 Yoshida et al. ............... 310/81

FOREIGN PATENT DOCUMENTS

JP      09-275659      10/1997
JP      09-285057      10/1997

* cited by examiner

Primary Examiner—Darren Schuberg
Assistant Examiner—Judson H. Jones
(74) Attorney, Agent, or Firm—Hogan & Hartson, LLP

(57) ABSTRACT

A motor includes a stator and a rotor having drive permanent magnets and a rotary shaft. The stator supports a core with coils wound thereon and includes a base plate. The base plate is formed with a resin, and is composed of a core supporting section that supports the core, a shaft supporting section that rotatably supports the rotary shaft, and attachment sections for attaching the motor to an apparatus. The core supporting section, the shaft supporting section and the attachment sections of the base plate are formed in one piece.

15 Claims, 7 Drawing Sheets

MOTOR WITH RESIN BASE PLATE

BACKGROUND OF THE INVENTION

1. Field of the Invention

The present invention relates to a motor with a resin base plate.

2. Related Background Art

A typical motor usually has a base plate to attach the motor to other various apparatuses (i.e., main body apparatuses in relation to the motor). To enable the motor to be firmly attached to a main body apparatus and to reduce noise caused by resonance, the base plate is required to have rigidity higher than a predetermined level. For this reason, materials used for base plates in conventional motors are metals that can easily ensure high rigidity.

Metals are used for the base plate also due to the fact that a bearing holder that supports a rotor shaft in a freely rotatable manner must be fixed to the base plate and that the base plate must be able to attach the motor to the apparatus firmly.

Next, an example of a conventional motor will be described below with reference to FIG. 9. In FIG. 9, a base plate 100, which is the base of a motor, is made of a metal plate and is formed by press-forming a metal plate, for example. At the center of the base plate 100 is a cylindrical hole formed through a burring processing, and in the cylindrical hole is press fit and fixed a bearing holder 102, which is a cylinder with bottom. On the outer circumference surface of the bearing holder 102 is mounted and fixed a center hole of a stator core 106. The stator core 106 has a plurality of salient poles arranged radially, and around each salient pole is wound a coil 108. The stator core 106 and the coils 108 form a stator 104.

On the inside of the bearing holder 102 is mounted a cylindrical bearing 116, which is made of a sintered metal and impregnated with a lubricating oil. In a shaft hole formed at the center of the bearing 116 is mounted in a freely rotatable manner a rotating shaft 118. The bearing 116 is a radial bearing, and the thrust load applied to the rotating shaft 118 is borne at the bottom section of the bearing holder 102. To the top end section of the rotating shaft 118 protruding from the top end of the bearing 116 is attached a disk chucking section 120, and under the disk chucking section 120 is attached a flat rotor case 112. On the inner surface of the cylindrical circumferential wall of the rotor case 112 is affixed a plurality of drive permanent magnets 114. The rotating shaft 118, the rotor case 112 and the drive permanent magnets 114 form a rotor 110 as a unitary structure that rotates. The disk chucking section 120 rotates with the rotor 110 in a unitary fashion.

As the above description makes clear, the conventional motor in FIG. 9 forms a motor that rotatably drives compact discs (CDs) and digital versatile disks (DVDs) and that can rotatably drive a disk mounted on the disk chucking section 120. The drive permanent magnets 114 are magnetized at a predetermined interval in the circumferential direction, and the rotor 110 can be rotatably driven by switching energization to various coils 108 depending on the rotational positions of the magnetic poles of the drive permanent magnets 114.

To supply power from an external power source to the coils to drive the motor, lead wires or a printed substrate is placed between the external power source and coil terminals. However, due to the fact that the coils 108 of the stator core 106 are made of an extremely thin wire material, connection sections formed when the terminals of the coils 108 are connected with lead wires or with a print substrate tend to be unstable and lacking in strength. For this reason, various mechanisms are used to connect the coil terminals with lead wires or a print substrate in a stable manner and with high strength. On the other hand, the structure of the lead wire terminal connection section requires some ingenuity to meet demands for a smaller and thinner motor as a whole. In addition, some thought must be given to prevent stress applied to the lead wires or print substrate from spreading to connection sections and coil terminals.

In one example of a connection structure formed by coil terminals and an external circuit, the connection structure involves a print substrate provided between the coil terminals and an external power source circuit, where the print substrate has a print pattern that connects to the external power source circuit and whose one end section is fixed to a motor frame through adhesion. The coil terminals are soldered at soldering lands at one end section of the print pattern. In the embodiment described in the publication, the print substrate used is a flexible print substrate.

Another conventional example of the connection structure formed by coil terminals and an external circuit is one in which the base plate of a motor is an iron plate circuit substrate, or an iron plate substrate overlaid with a hard power source supply circuit substrate, and coil terminals and external power source circuit are connected via such a circuit substrate.

As in the conventional example in FIG. 9, the base plate 100 that serves as the base of the motor is made of metal. The reason for this is that a metal makes it easy to ensure the rigidity required, which prevents resonance during rotational drive, which in turn makes it easy to reduce noise level. Furthermore, the bearing holder 102 must be held in a unitary fashion with a predetermined strength, the perpendicularity of the bearing holder 102 against the surface of the base plate 100 must be obtained at a high precision in order to obtain a high perpendicularity for a rotating center shaft, and both of these are thought to be more easily achieved if the base plate 100 is made of a metal.

However, if the material of the base plate 100 can be replaced with a resin, the base plate 100 can be made lighter and cheaper; in addition, using a resin should make it easy to mold the base plate 100 into intricate shapes as necessary.

However, if the shape of the conventional metal base plate is used when using a resin as the material for the base plate of a motor, the required rigidity cannot be obtained due to the fact that resins have a lower rigidity than metals. This causes the resonance frequency of the base plate to be lower, which causes the base plate to resonate when the motor rotates and the noise level to be high.

Furthermore, the connection structure formed by coil terminals and an external power source circuit in the conventional motor generally involves the intervention of a circuit substrate between the two. However, since the cost of the circuit substrate itself is high, the cost of the motor as a whole increases when the circuit substrate is used.

Moreover, due to the fact that the coil terminals are placed on a flat surface of the circuit substrate after they are soldered on soldering lands of the circuit substrate, when stress is applied to the circuit substrate, the stress is also applied to the soldered sections of the coil terminals and causes the wires to break.

In addition, as shown in FIG. 9, the thrust load applied to the rotating shaft 118 is designed to be borne by a resin thrust plate 122 placed at the bottom section of the bearing holder 102. This is to reduce the wear on the rotating shaft 118. If there is no resin thrust plate 122 and the thrust load applied to the rotating shaft 118 is borne directly by the bottom section of the metal bearing holder 102, the rotating shaft 118 wears severely. The resin thrust plate 122 is placed between the rotating shaft 118 and the bearing holder 102 for this reason; however, having the thrust plate 122 causes the positional precision in the axial direction of the rotating shaft 118, as well as the dimensional precision between the rotating shaft 118 and the stator core 106 and between the rotating shaft 118 and the base plate 100, to be poor.

Additionally, the structure itself, in which the bearing holder 102 as a separate part from the base plate 100 is fixed to the base plate 100, causes the perpendicularity precision of the bearing holder 102 against the surface of the base plate 100 to deteriorate; consequently, the perpendicularity of the rotating center shaft, including the perpendicularity of the bearing holder 102, must be adjusted during assembly, which causes the assembly process to be onerous.

When fixing the bearing holder 102 as a separate part from the base plate 100 to the base plate 100 through press fit, and press fitting and fixing the stator core 106 on the outer circumference side of the bearing holder 102, the height position of the stator core 106 must be adjusted; this contributes to the onerous assembly process.

SUMMARY OF THE INVENTION

The present invention is designed to solve the problems in prior art, and the present invention relates to a motor in which the noise level during rotational drive can be reduced by using a resin as the material for a base plate and implementing mechanisms to ensure the required rigidity.

The present invention also relates to a motor in which the cost is reduced by using a resin as the material of a base plate to allow coil terminals and an external power source to be connected without using a circuit substrate, and in which problems such as wire breakage can be reduced even in situations in which stress is applied to lead wires that connect the coil terminals with the external power source by making certain that stress would not be applied to the connection section formed by the coil terminals and lead wires.

The present invention relates to a motor that is more easily made thinner by using a resin as the material of a base plate, which prevents the outer diameter of lead wires from being added to the thickness dimension of the motor.

The present invention also relates to a motor in which a thrust plate as a separate member can be eliminated by using a resin as the material of a base plate and forming a part that functions as a bearing holder with the base plate in a unitary structure such that the resin bearing holder directly bears the thrust load applied to a rotating shaft, and in which the positional precision in the axial direction of the rotating shaft can consequently be improved.

The present invention also relates to a motor in which the adjustment of the perpendicularity of a rotational center shaft, as well as the adjustment of the height position of the stator core, can be eliminated by forming a part that regulates the height position of the stator core with a resin base plate in one piece.

In accordance with one embodiment of the present invention, a motor includes a stator and a rotor having drive permanent magnets, wherein the stator supports a core with coils wound thereon and has a base plate that includes a core-opposing surface and attachment sections for attaching the motor to an apparatus, wherein the base plate is formed with a resin, and the base plate and the core are fixed to each other through any one of a fixing element, a fixing device, a fixing member, and the like that affixes the base plate and the core (hereafter generally referred to a "fixing element").

According to the present invention described above, due to the fact that the core-opposing surface of the base plate is fixed to the core through the fixing element, the rigidity of the base plate can be enhanced in combination with that of the core, thereby increasing the resonance frequency of the base plate and reducing the noise caused when the motor rotatably drives, in spite of the fact that resin that tends to lack in rigidity is used as the base plate.

In the present invention, a plurality of attachment sections may be provided in the circumferential direction on the outer circumference section of the base plate. By having the base plate and the core fixed to each other through the fixing element at multiple positions on the outer circumference of the base plate and between the attachment sections, the resonance of the base plate is effectively prevented since the base plate is fixed to the core using the fixing element between the plurality of attachment sections where resonance tends to occur.

In the present invention, the core-opposing surface of the base plate may be affixed to the core using an adhesive as the fixing element. As a result, the rigidity of the base plate can be enhanced by combining it with the rigidity of the core.

In the present invention, the core may have a plurality of salient poles formed in the circumferential direction and protruding in the radial direction with a coil wound around each of the salient poles, and ribs that protrude towards the core and extend in the radial direction may be formed on the core-opposing surface of the base plate between the salient poles; the ribs and the core can be fixed to each other using an adhesive.

With this structure, the formation of the ribs enhances the rigidity of the ribs themselves, and having the ribs between the core and the base plate allows the amount of adhesive used to be small while the adhesion surface area increases, which enhances the fixing strength between the core and the base plate.

A motor in accordance with an embodiment of the present invention has a core having a plurality of salient poles that are formed in the circumferential direction and protrude in the radial direction with a coil wound around each of the salient poles, as well as a base plate having a core-opposing surface that opposes the core and attachment sections for attaching the motor to an apparatus. The base plate has a core-opposing surface, which is formed with a resin and constitutes a reinforcement section that protrudes towards the core the closer it is to the core from the outer side in the radial direction and whose cross-sectional shape in the axial direction is triangular.

According to the present invention, due to the fact that the resin base plate has the core-opposing surface that constitutes the reinforcement section that protrudes towards the core the closer it is to the core from the outer side in the radial direction and whose cross-sectional shape in the axial direction is triangular, the base plate is thicker the closer it is to the center, which enhances the rigidity of the base plate itself.

In the present invention, the reinforcement section of the base plate may be provided with ribs that protrude towards the core and extend in the radial direction between the adjacent salient poles, such that the rigidity of the base plate itself can be further enhanced.

In the present invention, the attachment sections may be formed in plurality in the circumferential direction on the outer circumference section of the base plate and by having the ribs positioned between the attachment sections. As a result, the rigidity of areas between the attachment sections where the base plate tends to resonate can be enhanced with the formation of the ribs.

In accordance with an embodiment of the present invention, a stator for a motor may support a core with coils wound around it, and has a base plate, which has attachment sections for attaching the motor to an apparatus, wherein the base plate is made of a resin and has grooves that serve to guide lead wires, which supply power to the coils, from the outer side towards the inner side to the vicinity of the coil terminals.

According to the present invention, due to the fact that the grooves that serve to guide lead wires, which supply power to the coils, from the outer side towards the inner side to the vicinity of the coil terminals are formed in the base plate formed with a resin, the lead wires are held embedded in the grooves and allows the external power source to be connected with the coil terminals without the intervention of a circuit substrate. Furthermore, even if stress is applied to the lead wires, the stress is dispersed on the wall surfaces of the grooves in contact with the lead wires, which reduces the impact of the stress on the connection sections formed by the lead wires and the coil terminals.

In the present invention, one surface side of the base plate may be the side on which the core is mounted, while the other surface side may be the side on which the grooves are formed. Through-holes that connect to the grooves may be formed in the vicinity of the coil terminals, and the lead wires may be embedded in the grooves and guided by the through-hole from the other surface side to the one surface side of the base plate. Consequently, connection sections in which the lead wires and the coil terminals are electrically connected can be provided on the one surface side on which the core is mounted. With this, grooves to embed the lead wires and through-holes can be easily formed in the resin base plate, and having the through-holes can easily prevent any impact of the stress from spreading to the connection sections formed by the lead wires and the coil terminals.

In the present invention, since the core has a plurality of salient poles formed in the circumferential direction and protruding in the radial direction with a coil wound around each salient pole, the connection sections can be formed between adjacent salient poles.

In the present invention, the lead wires may be fit in the grooves as bare wires.

In the present invention, the base plate may have a lead wire guiding section on the outer side, and the lead wire guiding section may have second through-holes that connect to the grooves. By having the lead wires guided to the grooves through the second through-holes, a structure more impervious to stress on the lead wires can be obtained.

In the present invention, resin films may cover the lead wires, guiding grooves may be formed continuously with the second through-holes in the lead wire guiding section on the core mounting side of the base plate, and the guiding grooves may be provided with a smaller width than the outer diameter of the resin film of the lead wires. By elastically deforming the resin films on the lead wires to fit in the guiding grooves, the lead wires can be retained to the base plate more securely.

In the present invention, the guiding grooves can be formed more outward in the radial direction than the second through-holes and continuously with the outer edge of the base plate.

In accordance with another embodiment of the present invention, a stator for a motor has a base plate, wherein the base plate is formed with resin and comprises a core supporting section that supports the core with coils wound around it, a shaft supporting section that rotatably supports a rotating shaft that rotates in a unitary fashion with the rotor, and attachment sections that attach the motor to an apparatus. The core supporting section may define a reference surface in the axial direction with which the core abuts, and the shaft supporting section may have a thrust receiving section with which the rotating shaft directly abuts in the thrust direction and that allows the rotating shaft to rotate.

According to the present invention, the base plate is formed with resin in a unitary structure with the core supporting section, the shaft supporting section that rotatably supports the rotating shaft, and the attachment sections that attach the motor to an apparatus; due to the fact that the core supporting section is the reference surface in the axial direction with which the core abuts and that the shaft supporting section has the thrust receiving section with which the rotating shaft directly abuts in the thrust direction and which allows the rotating shaft to rotate, the position of the rotating shaft in the axial direction is regulated by the resin thrust receiving section. As a result, while a thrust plate as a separate member can be eliminated, the positional precision of the rotating shaft in the axial direction, in particular with respect to the core, can be improved. In addition, improving the height position precision of the core supporting section against the attachment sections, which form a reference surface, and the perpendicularity of the shaft supporting section become easy, thereby making it possible to eliminate the core's height position adjustment and the shaft supporting section's perpendicularity adjustment from the assembly process.

In the present invention, drive permanent magnets and the core are magnetically coupled in the radial direction, and this is especially effective in motors in which the rotor rotates by having the energization to the coils switched.

The present invention is effective in applications to a disk drive motor having a rotor that has a disk mounting section and attachment sections of a base plate that are formed on a surface parallel with the disk mounting section. In this case, since the attachment sections of the base plate for attaching the motor to a main body apparatus are formed on a surface parallel to the disk mounting section of the rotor, the parallelism between the reference surface of the apparatus and the disk mounting section when the motor is attached to the main body apparatus can be obtained at high precision.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

A preferred embodiment of the present invention will be described below with reference to the accompanying drawings.

Figure 1:
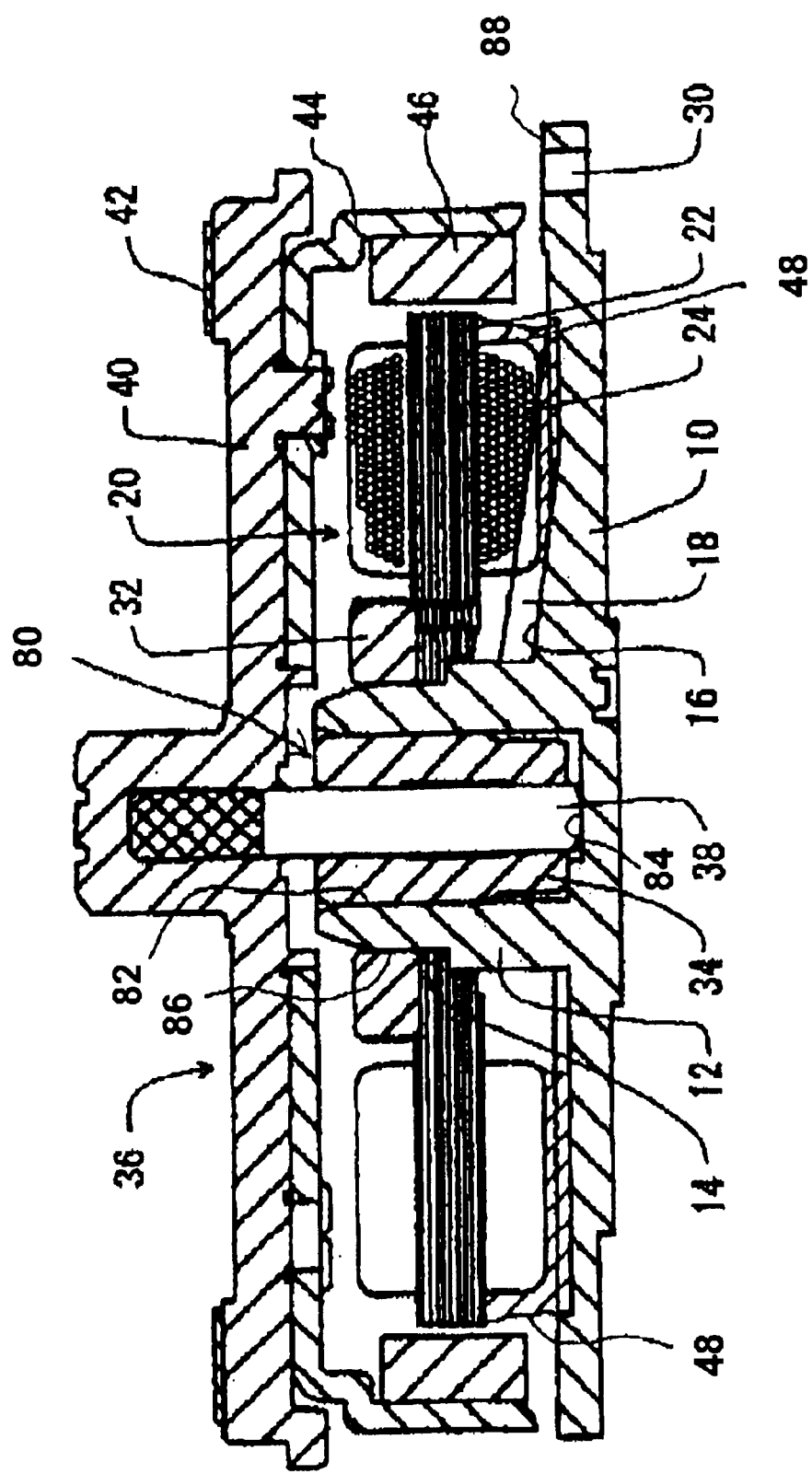
FIG. 1 is a cross-sectional view of a motor in accordance with an embodiment of the present invention.
Figure 2:
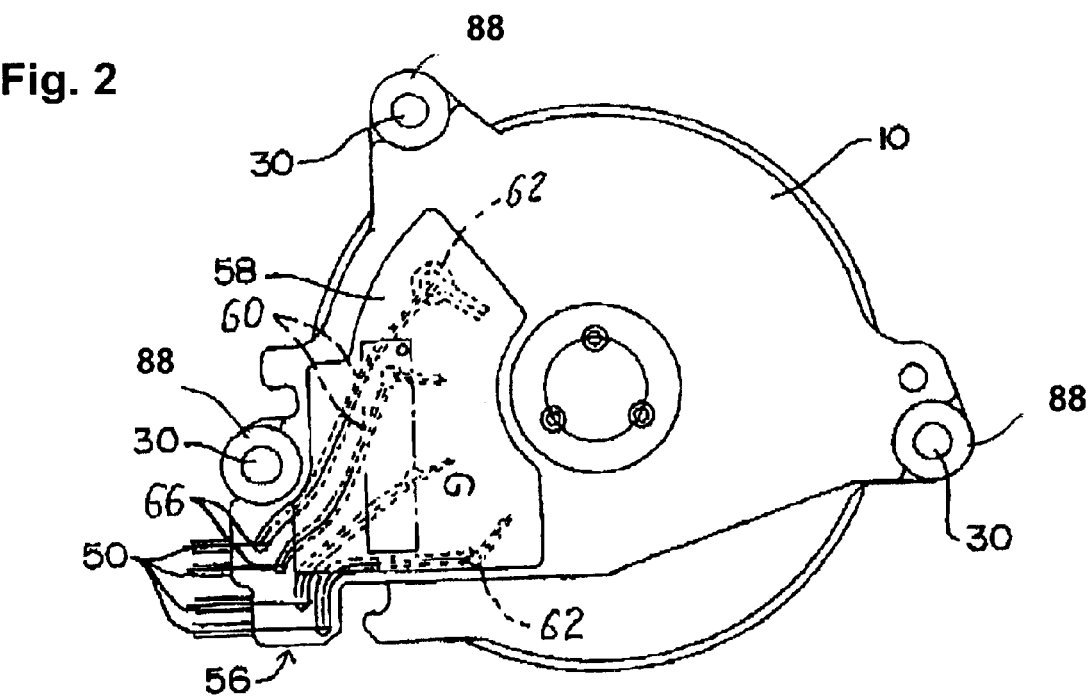
FIG. 2 is a bottom view of the motor in accordance with the embodiment.
Figure 3:
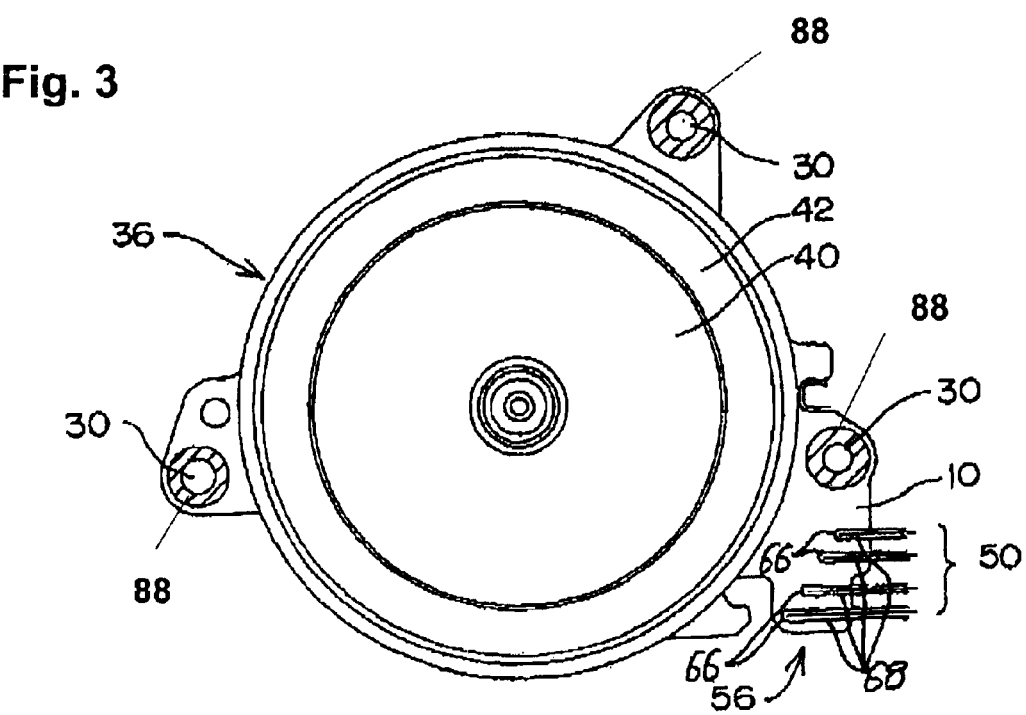
FIG. 3 is a plan view of the motor in accordance with the embodiment.

In FIG. 1, a base plate 10 that serves as a base of a motor is formed as a unitary resin structure. The base plate 10 is generally circular as indicated in FIGS. 2 through 5, with a bearing holder section 12, which is a cylinder with bottom, at the center section formed in a unitary structure. The outer circumference of the bearing holder section 12 has a larger diameter in nearly half of the base section side than in nearly half of the tip side, and has a core supporting section 14 formed in between. In the present embodiment, the core supporting section 14 is composed of a step section.

Figure 4:
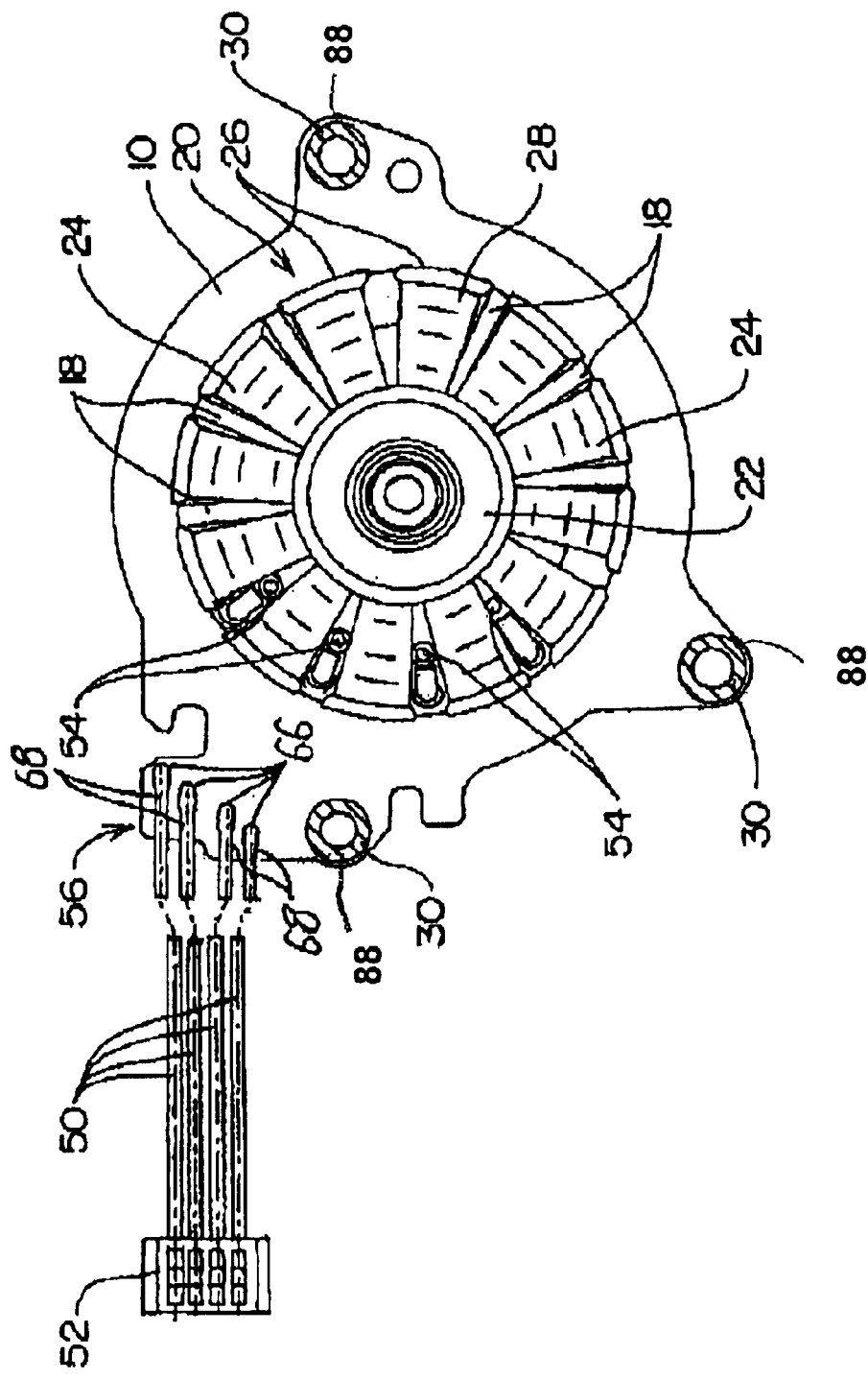
FIG. 4 is a plan view of the motor of the embodiment with a rotor removed.
Figure 5:
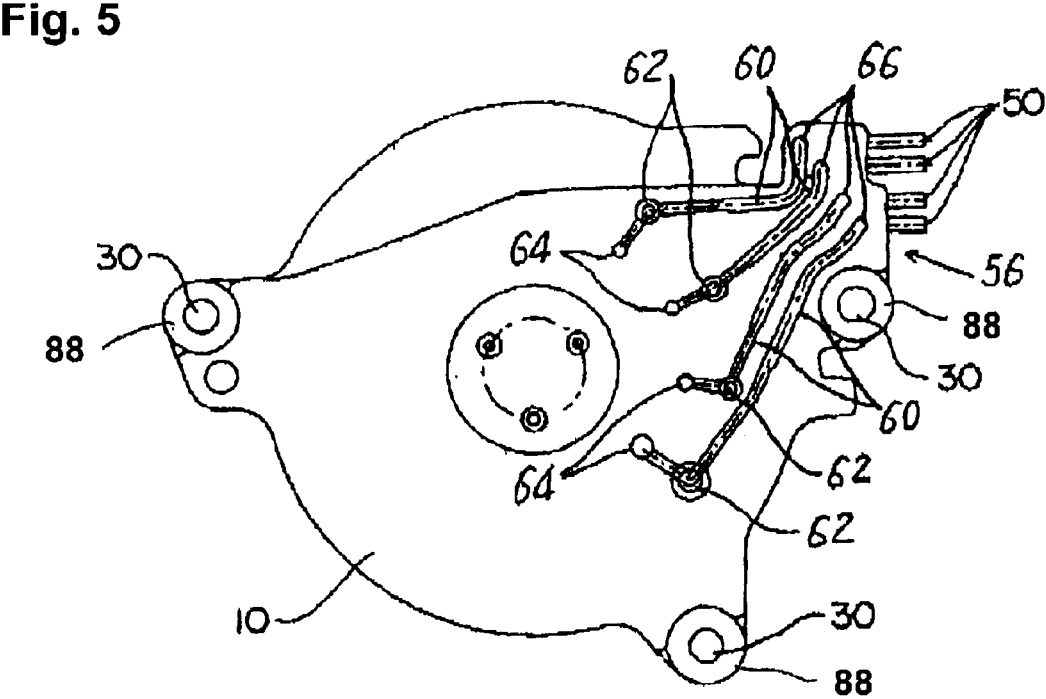
FIG. 5 is a bottom view of the motor of the embodiment showing a lead wire disposition section.
Figure 6:
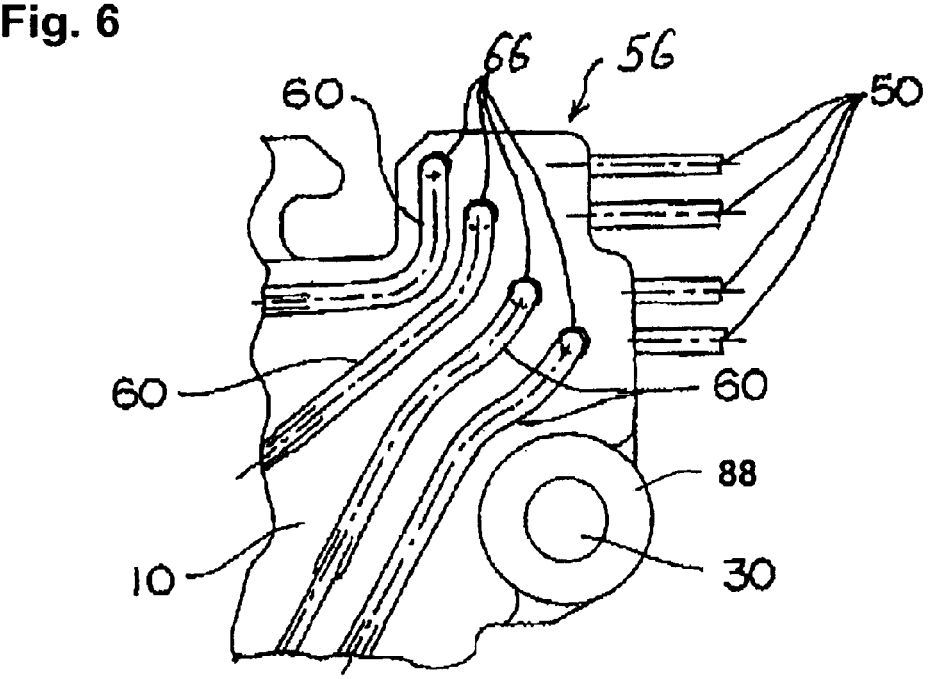
FIG. 6 is an enlarged bottom view in part of the motor of the embodiment showing the lead wire disposition section enlarged.

On the outer circumference of the bearing holder section 12 is mounted and fixed a center hole of a core 22. The core 22 has a step section formed by having a larger diameter for nearly half of its dimension in the thickness direction, and the step section is in contact with the core supporting section (step section) 14 of the bearing holder section 12. On the core 22 is mounted from above a ring-shaped magnet 32 along the outer circumference of the bearing holder section 12 in such a way that the ring-shaped magnet 32 and the core 22 are press fit, glued and fixed to the core supporting section (step section) 14 of the bearing holder section 12. The press fit or gluing constitutes a fixing element between the base plate 10 and the core 22. As shown in FIG. 4, the core 22 has a plurality of salient poles 26 radially formed in the circumferential direction and protruding in the radial direction, with a coil 24 wound around each salient pole 26. The base plate 10, the core 22 and the coils 24 form a stator 20. An adhesive is filled among the core 22, the coils 24 and the base plate 10. The adhesive constitutes a fixing element between the base plate 10 and the core 22 and also enhances the rigidity of the stator 20, including the base plate 10. The fixing element between the base plate 10 and the core 22 may be press fitting or adhering the core 22 to the core supporting section 14 of the bearing holder section 12, adhering the core 22 with the coils 24 and the base plate 10, an appropriate combination of these, or all of these.

As shown in FIGS. 2 through 5, the base plate 10 has attachment sections 88 that attach the motor to various apparatuses (main body apparatuses). The attachment sections 88 are formed in plurality in the circumferential direction on the outer circumference section of the base plate 10 and protruding outward in the radial direction. In this example, each of the attachment sections 88 includes a through-hole 30 for a screw that attaches the base plate 10 to an apparatus. The base plate 10 has a core-opposing surface 16 that opposes the core 22, and the core 22 and the core-opposing surface 16 that opposes the core 22 are fixed to each other by a fixing element. The fixing element is an adhesive according to the present embodiment. The relations among the core-opposing surface 16, the core 22 and the adhesive will be described in detail later.

As shown in FIG. 1, the core-opposing surface 16 serves as a reinforcement section that protrudes towards the core 22 the closer it is to the center from the outer side in the radial direction and whose cross-sectional shape in the axial direction is triangular. In other words, the thickness of the reinforcement section of the core-opposing surface 16 increases gradually from the outer side in the radial direction towards the center in such a way that its cross-sectional shape along the axial line is a triangular shape with a gentle slope. However, the cross-sectional shape of the entire core-opposing surface 16 may not be triangular; at least those parts of the core-opposing surface 16 bounded by the plurality of attachment sections 88, i.e., those parts interposed by the plurality of attachment sections 88, in the circumferential direction with the rotational center as the center have a triangular cross-sectional shape.

Furthermore, as shown in FIG. 4, the core-opposing surface 16 of the base plate 10, whose cross-sectional shape is triangular, forms a unitary structure with ribs 18, which protrude towards the core 22 between the salient poles 26, or more accurately between the coils 24, of the core 22 and extend in the radial direction. In the example shown in FIG. 4, the core 22 has 12 salient poles 26 and the attachment section 88 in three locations. While two of the attachment sections 88 are close to each other, the third is relatively removed from the other two in the circumferential direction; between the relatively removed attachment section 88 and each of the two other attachment sections 88, there are three ribs 18 each formed in the radial direction with the bearing holder section 12 as the center, for a total of six ribs 18. The core-opposing surface 16, which is the reinforcement section of the base plate 10, is glued and fixed to the core 22 with an adhesive 48 as a fixing element. The adhesive 48 adheres and fixes the core 22 directly, or indirectly via the coils 24, with the base plate 10; since this fixing constitutes a flat fixing that fixes the outer circumference section and the center section of the core 22, the core 22 and the base plate 10 are firmly fixed to each other. When the center section of the core 22 and the core supporting section (step section) 14 of the bearing holder section 12 formed on the base plate 10 are fixed to each other, the fixing strength is made even more solid.

Figure 7:
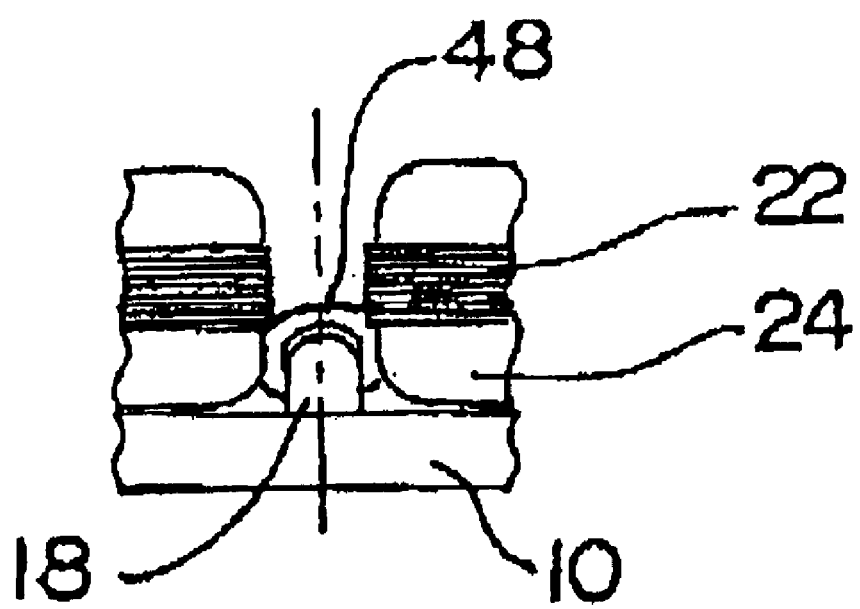
FIG. 7 is a front view in part of a fixing member part between a core and a base plate according to the present embodiment.

FIG. 7 shows the fixing element. As indicated in FIG. 7, one of the ribs 18 protrudes towards the core 22 between the adjacent coils 24, and the adhesive 48 as the fixing element is coated among the rib 18, the core 22 and the coils 24 such that the rib 18 and the adhesive 48 are in contact. In this way, the base plate 10 is further fixed to the core 22 by the adhesive 48 and the intervening ribs 18, which serve as a reinforcement of the base plate 10 itself, and the fixing strength between the two members is further enhanced.

On the inner circumference side of the bearing holder section 12 of the base plate 10 is mounted a cylindrical bearing 34. The bearing 34 is an oil-impregnated sintered bearing. In the center bearing hole of the bearing 34 is mounted in a freely rotatable manner a rotating shaft 38. The bearing 34 is a radial bearing, and load in the thrust direction applied to the rotating shaft 38 is borne by an inner bottom surface of the bearing holder section 12. At the top end section of the rotating shaft 38 protruding from the top end of the bearing 34 is fixed in a unitary fashion a rotor 36. The rotor 36 comprises a hub 40 whose center axial hole is mounted on the rotating shaft 38 and which forms a unitary structure with the rotating shaft 38, a flat cup-shaped rotor case 44 that is joined in a unitary fashion through caulking with the bottom surface side of the hub 40, and ring-shaped drive permanent magnets 46 affixed on the inner circumference surface of the circumference wall of the rotor case 44. On the upper surface of the outer circumference end section of the hub 40 is formed a disk mounting section 42. In this way, the motor according to the embodiment in the drawings is structured as a motor that rotatably drives disks. The use of the motor according to the present invention is not limited to rotatably drive disks and can be applied to motors for various uses.

The inner circumference surface of the drive permanent magnets 46 and the end surface of the salient poles 26 of the core 22 oppose each other across an appropriate gap, and the drive permanent magnets 46 and the opposing salient poles 26 of the core 22 are magnetically coupled in the radial direction. The drive permanent magnets 46 are arranged in such a way that the N pole and the S pole alternate at a constant interval in the circumferential direction. By switching the power supply to each coil 24 depending on the rotational position of each magnetic pole of the drive permanent magnets 46, the electromagnetic attractive-repulsive forces between the core 22 and the drive permanent magnets 46 cause the drive permanent magnets 46 to move in the circumferential direction, thereby rotatably driving the rotor 36. In addition, a disk not shown but mounted on the disk mounting section 42 is rotatably driven along with the rotor 36.

According to the embodiment described above, although a resin that tends to lack in rigidity is used for the base plate 10, due to the fact that the core-opposing surface 16 of the base plate 10 that opposes the core 22 is fixed to the core 22 using the adhesive 48 as the fixing element, the rigidity of the base plate 10 is enhanced in combination with that of the core 22; as a result, the resonance frequency of the base plate 10 is increased, which reduces the noise caused when the motor rotatably drives.

The base plate 10 has a plurality of attachment sections 88 in the circumferential direction on its outer circumference section to attach the motor to various apparatuses. The areas in vicinity of the attachment sections 88 do not tend to resonate due to the fact that the areas are fixed to an apparatus. For this reason, in the embodiment, the base plate 10 is fixed to the core 22 using the adhesive 48 as the fixing element in areas that are between the plurality of attachment sections 88 and that tend to resonate. By doing this, the base plate 10 can be effectively prevented from resonating.

According to the present embodiment, the ribs 18 that protrude towards the core 22 between the plurality of salient poles 26 of the core 22 and that extend in the radial direction are formed on the core-opposing surface 16 of the base plate 10; due to the fact that the ribs 18 and the adhesive 48 are in contact, not only is the base plate 10 itself reinforced by the ribs 18, but the base plate 10 and the core 22 are more securely and more firmly fixed to each other by having the two elements glued and fixed to each other with the ribs 18 in between.

If there were no ribs 18 between the core 22 and the base plate 10, there would be a relatively large space between the core 22 and the base plate 10, and even if the adhesive were to be coated in this space, the adhesive would only spread along the surfaces of the core 22 and the base plate 10; consequently, while the amount of the adhesive between the core 22 and base plate 10 would increase, the surface area to adhere the two members to each other would remain small and the fixing strength between the two elements would not be enhanced.

According to the present embodiment, however, there are the ribs 18 between the core 22 and the base plate 10, as shown in FIG. 7, and the adhesive 48 permeates among the core 22, the base plate 10 and the ribs 18 due to surface tension; as a result, the adhesion surface area increases while the amount of the adhesive 48 used is small and the fixing strength between the core 22 and the base plate 10 can be enhanced.

Furthermore, due to the fact that the core-opposing surface 16 of the resin base plate 10 is the reinforcement section that protrudes towards the core 22 the closer it is to the center from the outer side in the radial direction and whose cross-sectional shape in the axial direction is triangular, the thickness of the core-opposing surface 16 increases towards the center, thereby enhancing the rigidity of the base plate 10 itself. In addition, forming the ribs 18 further enhances the rigidity of the base plate 10 itself.

It has been found that when the attachment sections 88 of the base plate 10 are attached to a main body apparatus, the areas in vicinity of the attachment sections 88 do not resonate, while areas between adjacent attachment sections 88 do. For this reason, the ribs 18 designed to enhance the rigidity of the base plate 10 are formed between the attachment sections 88. This increases the resonance frequency of the base plate 10 and reduces the noise caused during rotational drive.

Next, the structure of a lead wire guiding section 56 will be described in detail. In FIGS. 2 through 6, in the lead wire guiding section 56 are formed four grooves 60 to guide lead wires 50, which supply power to each of the coils 24, from the outer circumference side of the base plate 10 towards the inner circumference side to the vicinity of terminals of the coils 24. One surface side (the top surface side) of the base plate 10 is the side on which to mount the core 22, and the other surface side (the bottom surface side) is the side on which the grooves 60 are formed; near the terminals of the coils 24 are formed through-holes 62 that connect to both the one surface side and the other surface side, as well as to the grooves 60. Adjacent to the through-holes 62 are formed a separate set of through-holes 64.

In the lead wire guiding section 56 of the base plate 10 are formed second through-holes 66 that connect to the grooves 60. In the lead wire guiding section 56 are also formed guiding grooves 68, which connect to the second through-holes 66, on the outer side in the radial direction than the second through-holes 66 on the base plate 10 and on the core mounting side of the base plate 10. The guiding grooves 68 are formed continuously to the outer edge of the base plate 10. The grooves 60, the through-holes 62, the through-holes 64, the second through-holes 66 and the guiding grooves 68 are formed four each to match the number of lead wires 50 used.

Each lead wire 50 is insulated by an insulating layer, e.g. a resin film, and the width of the guiding grooves 68 is formed slightly smaller than the outer diameter of the resin film on the lead wires 50. The resin film on each lead wire 50 is elastically deformed to fit in the guiding grooves 68 that are formed on the core mounting side of the base plate 10. Each lead wire 50 is firmly fit in the corresponding guiding groove 68 by the elasticity of the resin film on it. Each guiding groove 68 is formed continuously to the outer edge of the base plate 10 and each lead wire 50 is fit in the corresponding guiding groove 68 along the entire length of it; consequently, each lead wire 50 is guided parallel to the surface of the base plate 10 and embedded in the corresponding guiding groove 68.

Each lead wire 50 is guided to the second through-hole 66 that connects to the corresponding guiding groove 68 and to the other surface side of the base plate 10. On the other surface side of the base plate 10 are the grooves 60 connecting from the second through-holes 66, and each lead wire 50 is fit in the corresponding groove 60. However, each lead wire 50 has its resin film removed and is a bare wire from where it meets the corresponding second through-hole 66 to the end section. The width of each groove 60 is determined based on the outer diameter of the bare wire and the bare part of each lead wire 50 fits in the corresponding groove 60 with a certain amount of friction.

The bare end section of each lead wire 50 fit in the corresponding groove 60 is subsequently guided into the corresponding through-hole 62 and to the core mounting side of the base plate 10. The terminals of the coils 24 can be soldered directly to the bare end section of the corresponding lead wire 50 guided to the core mounting side, but in the embodiment shown in the drawings, the bare end section of each lead wire 50 is further guided through another through-hole 64 and through the through-hole 62 again to be returned to the core mounting side of the base plate 10. In other words, two sets of the through-holes 62 and 64 are utilized to wind the bare end sections of the lead wires 50 between them. The terminals of the coils 24 are then soldered to the bare end section of the corresponding lead wire 50 to form a connection section 54 that electrically connects the lead wire 50 with the terminals of the corresponding coils 24.

The end section of each lead wire 50 is thus more firmly fixed, such that even if stress were to be applied to the lead wire 50, the impact of the stress would not spread to the connection section 54 with the terminals of the corresponding coils 24.

However, the end sections of the lead wires 50 may or may not be wound around the two sets of the through-holes 62 and 64; even if the terminals of the coils 24 are directly soldered to the bare end section of the corresponding lead wire 50 guided to the core mounting side, the structure makes it difficult for impact of any stress on the lead wire 50 to spread to the connection section 54 with the terminals of the corresponding coils 24 due to the fact that each lead wire 50 is held by the corresponding groove 60. Furthermore, the coils 24 may be guided to the bottom surface through the through-holes 62, guided along grooves and to the core mounting side through the through-holes 64, to be soldered to the corresponding lead wire 50 on the core mounting side; this would also achieve the intended effect.

The coils 24 have a three-phase structure, and one end of the coils 24 in each phase is connected together to form a Y connection. The four lead wires 50, which supply power to the coils 24 with a Y connection, are guided through the lead wire guiding section 56 formed in one section on the outer circumference of the base plate 10. One end section of each of the four lead wires 50 is connected to an external feed circuit via a connector 52.

As described above, the other end section of each lead wire 50 is guided along both the front and back surfaces of the base plate 10 in the lead wire guiding section 56, and there is a possibility that problems such as the lead wires 50 causing each other to short or an interference with the rotor 36, described later, could occur when the lead wires 50 come loose from the surfaces of the lead wire guiding section 56. For this reason, the grooves 60 and 68 to embed the lead wires 50 are formed on both the front and rear sides of the lead wire guiding section 56 of the base plate 10 along a route to guide the lead wires 50, so that the other end section of each lead wire 50 is embedded in the corresponding lead groove 60 and 68.

The four connection sections 54 formed by the end sections of the lead wires 50 and the terminals of the coils 24 are located in gaps between the adjacent coils 24, as shown in FIG. 4. The connection sections 54 are located in parts without the triangular cross sections, i.e., in parts where the ribs 18 are not formed. The other end sections of the lead wires 50 are contained in gaps between the adjacent coils 24, and each connection section 54 is formed by intertwining and soldering the end section of the lead wire 50 with the terminals of the corresponding coils 24. Parts of the connection sections 54 that protrude above the top surface of the coils 24 are cut in such a way that the top end of the connection sections 54 is at the same height or lower than the top surface of the coils 24. The cut surfaces of the connection sections 54 are coated with insulation paint or an insulating adhesive to fix the connection sections 54.

On the bottom surface of the base plate 10, i.e., the surface on which the grooves 60 are formed, an insulating plate 58 is affixed to cover the area in which the lead wires 50 are guided.

Referring back to FIG. 1, the coil 24 wound around each salient pole 26 of the core 22 has a fewer number of winding layers towards the inner side from the outer side in the radial direction. This is to accommodate the core-opposing surface 16 of the base plate 10, which serves as the reinforcement section that protrudes towards the core 22 the closer it is to the center from the outer side in the radial direction and whose cross-sectional shape in the axial direction is triangular. Since the interval between adjacent salient poles 26 of the core 22 grows smaller from the outer side in the radial direction towards the center, having a fewer number of winding layers towards the inner side contributes to an effective use of the space provided.

The four connection sections 54 are thus formed by connecting the four terminals of the coils 24, which have a Y connection, with the end sections of the lead wires 50. There is a possibility that problems such as the lead wires 50 causing each other to short or an interference with the rotor 36, described later, could occur when the lead wires 50 come loose from the surfaces of the lead wire guiding section 56, but such defects can be prevented by embedding the end section of each lead wire 50 in the corresponding groove 60 as described above.

According to the present embodiment, due to the fact that the grooves 60 that serve to guide the lead wires 50, which supply power to the coils 24, from the outer side towards the inner side to the vicinity of the terminals of the coils 24 are formed in the base plate 10 formed with resin, the lead wires 50 are held embedded in the grooves 60 and allows the external power source to be connected with the terminals of the coils 24 without the intervention of a circuit substrate. Further, even if stress is applied to the lead wires 50, the stress is dispersed on the wall surfaces of the grooves 60 in contact with the lead wires 50, which reduces the impact of the stress on the connection sections 54 formed by the lead wires 50 and the terminals of the coils 24.

The through-holes 62 that connect to the grooves 60 are formed on the base plate 10 in the vicinity of the terminals of the coils 24 and the lead wires 50 are embedded in the grooves 60 and guided from the other surface side to the one surface side of the base plate 10 through the through-holes 62, while the connection sections 54 formed by the lead wires 50 and the terminals of the coils 24 are provided on the one surface side. As a result, the lead wires 50 are held on both sides of the base plate 10, which causes them to be held in a more stable manner; in addition, the external power source and the terminals of the coils 24 can be connected without the intervention of a circuit substrate, and the impact of stress on the lead wires 50 spreading to the connection sections 54 can be more effectively reduced.

Furthermore, the base plate 10 has the lead wire guiding section 56 on the outer side, the lead wire guiding section 56 has the second through-holes 66 that connect to the grooves 60, and the lead wires 50 are guided to the grooves 60 through the second through-holes 66. As a result, the lead wires 50 are held in an even more stable manner as they are guided from one surface side to the other surface side, and back to the one surface side, thereby ensuring the effects described earlier.

Moreover, the lead wires 50 have a resin film, and the guiding grooves 68 that are continuous with the second through-holes 66 are formed in the lead wire guiding section 56 on the core mounting side of the base plate 10; since the width of the guiding grooves 68 is smaller than the outer diameter of the resin film of the lead wires 50, the resin film on the lead wires 50 is elastically deformed to fit in the guiding grooves 68. This causes the lead wires 50 to be held in a stable manner by the base plate 10, further ensuring the effects described earlier.

As shown in FIG. 1, the outer circumference of the bearing holder section 12 has a larger diameter in nearly half of its base section side than in its tip side, and has a step section formed in between. The step section defines the core supporting section 14; the outer circumference of nearly half of the tip of the bearing holder section 12 has a diameter smaller than that of the base section of the bearing holder section 12, and the tip part of the bearing holder section 12 with a small diameter forms a core engaging section 86. The core supporting section 14 defines a reference surface in the axial direction with which the core 22, described below, abuts.

Figure 8:
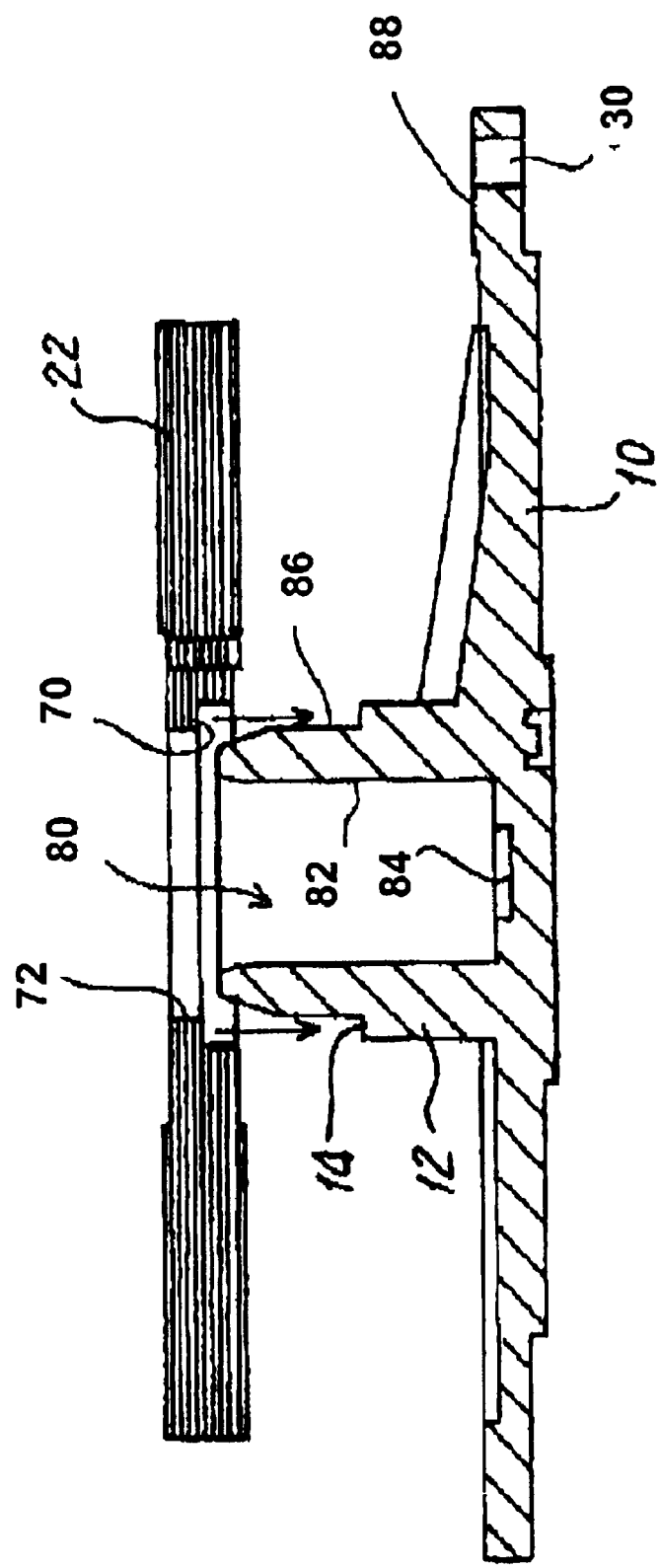
FIG. 8 is a cross-sectional view indicating the relationship between the base plate and the core according to the present embodiment.
Figure 9:
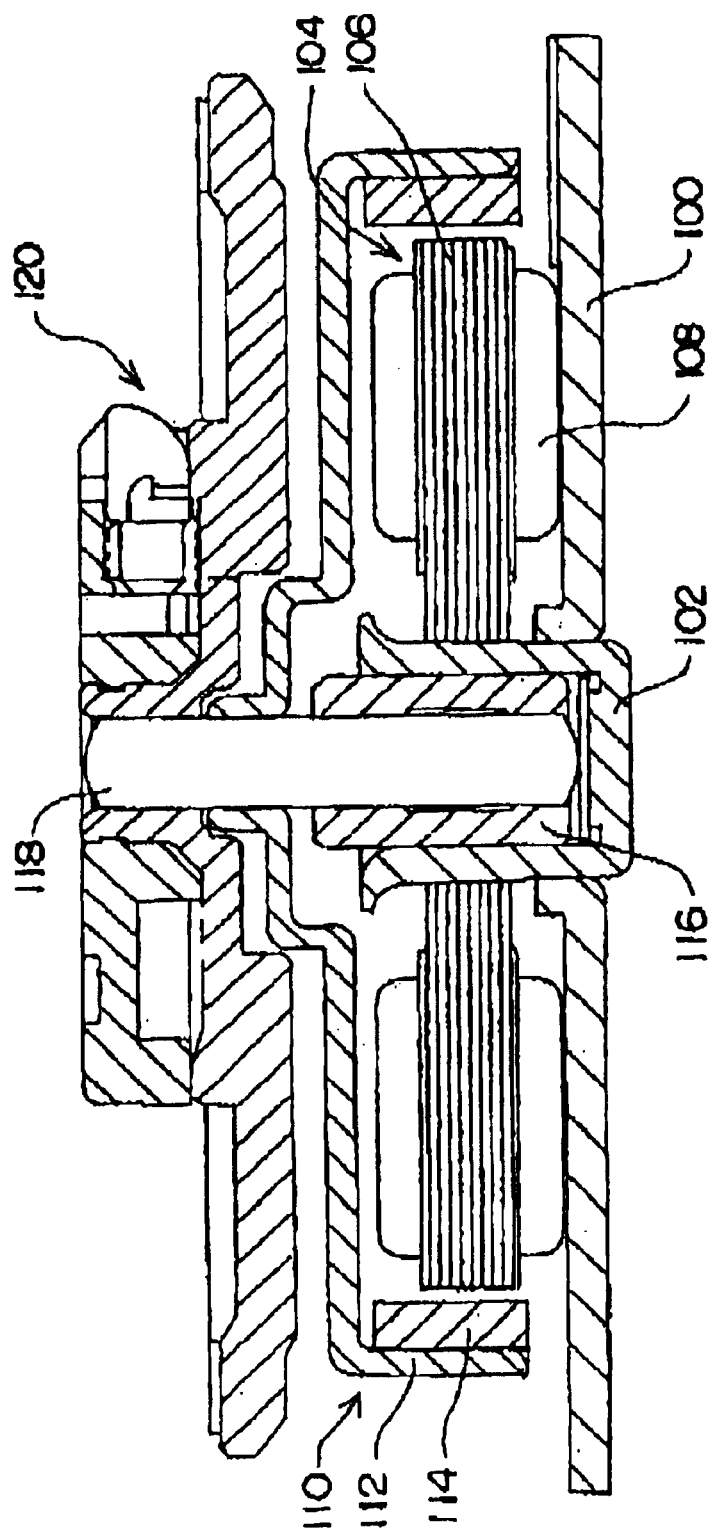
FIG. 9 is a cross-sectional view of an example of a conventional motor.

As shown in FIG. 8, on the outer circumference of the bearing holder section 12 is mounted and fixed a center hole 72 of the core 22. In the center hole 72 of the core 22, a step section 70 is formed by a larger diameter in nearly half of the bottom in the thickness direction of the center hole 72, and the step section 70 is in contact with the core supporting section 14 of the bearing holder section 12. Nearly half of the top of the center hole 72 of the core 22 is a small diameter section, and the small diameter section is mounted on the core mounting section 86 of the bearing holder section 12. The ring-shaped magnet 32 is mounted from above on the core 22 along the outer circumference of the core mounting section 86 of the bearing holder 12, and the ring-shaped magnet 32 and the core 22 are press fit, glued and fixed to the core supporting section 14 of the bearing holder section 12. As shown in FIG. 4, the core 22 has a plurality of salient poles 26 radially formed in the circumferential direction and protruding in the radial direction, and the coil 24 is wound around each salient pole 26. The base plate 10, the core 22 and the coils 24 form the stator 20.

The base plate 10 has attachment sections 88 that attach the motor to various apparatuses, and an attachment hole 30 is formed in each of the attachment sections 88. The attachment sections 88 are formed in plurality in the circumferential direction on the outer circumference section of the base plate 10 and protruding outward in the radial direction. Consequently, the attachment holes 30 are formed in plurality in accordance with the number of the attachment sections 88. The attachment sections 88 are provided on the core mounting side of the base plate 10, and the attachment sections 88 serve as a mounting reference surface when installing the motor on various main body apparatuses. The attachment sections 88 of the base plate 10 are formed on a surface parallel with the disk mounting section 42.

As shown in FIG. 8, on the inner circumference side of the bearing holder section 12, which is a cylinder with bottom, of the base plate 10 is a shaft supporting section 80 that rotatably supports the rotating shaft 38, which rotates in a unitary fashion with the rotor 36. The shaft supporting section 80 comprises a bearing retaining surface 82, which consists of the inner circumference wall of the bearing holder section 12, as well as a thrust receiving section 84 with which the rotating shaft 38 directly abuts in the thrust direction and that allows the rotating shaft 38 to rotate. The bottom section of the cylindrical bearing holder section 12 corresponds to the thrust receiving section 84.

On the bearing retaining surface 82 of the shaft supporting section 80 of the bearing holder section 12 is mounted the cylindrical bearing 34. The bearing 34 is a radial bearing comprising an oil-impregnated sintered bearing. In the center bearing hole of the bearing 34 is mounted in a freely rotatable manner the rotating shaft 38. The bottom end of the rotating shaft 38 directly abuts the thrust receiving section 84, which is a part of the shaft supporting section 80 of the bearing holder section 12, such that the load in the thrust direction applied to the rotating shaft 38 is borne by the thrust receiving section 84.

According to the present embodiment, the base plate 10 is formed with resin in a unitary structure with the core supporting section 14, the shaft supporting section 80 that rotatably supports the rotating shaft 38, and the attachment sections 88 that attach the motor to a main body apparatus; due to the fact that the core supporting section 14 defines a reference surface in the axial direction with which the core 22 abuts and that the shaft supporting section 80 has the thrust receiving section 84 with which the rotating shaft 38 directly abuts in the thrust direction and which allows the rotating shaft 38 to rotate, the position of the rotating shaft 38 in the axial direction is regulated by the resin thrust receiving section 84; this allows a thrust plate as a separate member to be eliminated and the positional precision of the rotating shaft 38 in the axial direction to be improved.

Furthermore, due to the fact that the base plate 10 is made of resin and has a unitary structure with the core supporting section 14 that supports the core 22 around which are wound the coils 24, the relative positional precision between the attachment sections 88, which form the reference surface of the base plate 10, and the core supporting section 14 can be improved, and the height position of the core 22 can be determined with high precision by simply abutting the step section 70 of the core 22 with the core supporting section 14, as long as the precision of the forming metal mold is strictly controlled. Consequently, a process to adjust the height position of the core 22 becomes unnecessary, which can simplify the assembly process.

Further according to the present embodiment, due to fact that the shaft supporting section 80, which rotatably supports the rotating shaft 38 that rotates in a unitary fashion with the rotor 36, forms a unitary structure with the attachment sections 88, which form the reference surface of the base plate 10, the perpendicularity of the shaft supporting section 80 against the surface of the attachment sections 88 can be enhanced and the rotational precision of the rotor 36 can be enhanced by simply assembling the bearing 34 and the rotating shaft 38 to the shaft supporting section 80, as long as the precision of the forming metal mold is strictly controlled. Consequently, a process to adjust the perpendicularity of the shaft supporting section 80 becomes unnecessary, which can simplify the assembly process.

The demand for higher speed rotation is especially keen for motors that rotatably drive disks, and this demand can be met by improving the rotational precision of the rotor.

Another demand made on motors that rotatably drive disks is rigorous parallelism between the attachment sections 88 and the disk mounting section 42; according to the present embodiment, however, the parallelism between the attachment sections 88 and the disk mounting section 42 can be improved by improving the perpendicularity of the shaft supporting section 80.

Due to the fact that the shaft supporting section 80 has the thrust receiving section 84 with which the rotating shaft 38 directly abuts, there is no need to provide a thrust receiving section as a separate part; consequently, the number of parts can be reduced and the assembly process can be simplified.

According to the present invention described above, due to the fact that a core-opposing surface of a base plate is fixed to a core through a fixing element, the rigidity of the base plate can be enhanced in combination with that of the core, thereby increasing the resonance frequency of the base plate and reducing the noise caused when the motor rotatably drives, in spite of the fact that resin that tends to lack in rigidity is used as the base plate.

Further according to the present invention, due to the fact that grooves that serve to guide lead wires, which supply power to coils, from the outer side towards the inner side to the vicinity of terminals of the coils are formed in the resin base plate, the lead wires are held embedded in the grooves and allows an external power source to be connected with the terminals of the coils without the intervention of a circuit substrate. In addition, even if stress is applied to the lead wires, the stress is dispersed on the wall surfaces of the grooves in contact with the lead wires, which reduces the impact of the stress on the connection sections formed by the lead wires and the coils.

Moreover according to the present invention, the base plate is formed with resin in a unitary structure with a core supporting section, a shaft supporting section that rotatably supports a rotating shaft, and attachment sections that attach the motor to a main body apparatus; due to the fact that the core supporting section defines a reference surface in the axial direction with which the core abuts and that the shaft supporting section has a thrust receiving section with which the rotating shaft directly abuts in the thrust direction and which allows the rotating shaft to rotate, the position of the rotating shaft in the axial direction is regulated by the resin thrust receiving section; this allows a thrust plate as a separate member to be eliminated and the positional precision of the rotating shaft in the axial direction to be improved. In addition, improving the height position precision of the core supporting section against the attachment sections, which form a reference surface, and the perpendicularity of the shaft supporting section become easy, thereby making it possible to eliminate the core's height position adjustment and the shaft supporting section's perpendicularity adjustment from the assembly process.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:

a rotor having drive permanent magnets; and a stator having a core with coils wound thereon and a base plate having attachment sections for attaching the motor, wherein the base plate is made of resin and has grooves that guide lead wires embedded in the grooves to supply power to the coils, from an outer side towards an inner side of the base plate to the vicinity of coil terminals of the coils, wherein one surface side of the base plate defines a side on which the core is mounted, another surface side defines a side in which the grooves are formed, and the base plate includes first through-holes that extend between one surface and the other surface of the base plate and connect to the grooves formed in the vicinity of the coil terminals, and wherein the base plate has a lead wire guiding section on the outer side thereof, and the lead wire guiding section has second through-holes that connect to the grooves.

2. A motor according to claim 1, wherein the lead wires are embedded in the grooves and guided by the first through-holes from the other surface side to the one surface side of the base plate.

3. A motor according to claim 2, further comprising connection sections provided on the one surface side for electrically connecting the lead wires and the coil terminals.

4. A motor according to claim 3, wherein the core has a plurality of salient poles formed in a circumferential direction and protruding in a radial direction with each of the coils wound on each of the salient poles, and the connection sections are formed between adjacent ones of the salient poles.

5. A motor according to claim 1, wherein the lead wires are embedded in the grooves as bare wires.

6. A motor comprising:

a rotor having drive permanent magnets; and a stator having a core with coils wound thereon and a base plate having attachment sections for attaching the motor, wherein the base plate is made of resin and has grooves that guide lead wires embedded in the grooves to supply power to the coils, from an outer side towards an inner side of the base plate to the vicinity of coil terminals of the coils, wherein the base plate has a lead wire guiding section on the outer side thereof, and the lead wire guiding section has through-holes that connect to the grooves, and wherein resin films cover the lead wires, and guiding grooves are formed continuously with the through-holes in the lead wire guiding section on a surface side of the base plate on which the core is mounted, each of the guiding grooves having a width smaller than an outer diameter of each of the resin films of the lead wires.

7. A motor according to claim 6, wherein the resin films on the lead wires are elastically deformed to fit in the guiding grooves.

8. A motor according to claim 7, wherein the guiding grooves are formed more outward in the radial direction than the through-holes and continuously with an outer edge of the base plate.

9. A motor comprising:
- a rotor having drive permanent magnets; and
- a stator having a core with coils wound thereon and a base plate having attachment sections for attaching the motor,
- wherein the base plate is made of resin and has grooves formed on a face of the base plate,
- the respective grooves are formed from an outer side to vicinities of respective coil terminals of the coils so as to correspond to lead wires for supplying power to the coils,
- spaces between the respective grooves at the vicinities of the respective coil terminals is larger than spaces between the respective grooves at the outer side, and
- the respective grooves are formed such that the lead wires are respectively fitted into the grooves and guided to the respective vicinities of coil terminals of the coils to be positioned with wider spaces than the spaces at the outer side.

10. A motor according to claim 9, wherein one surface side of the base plate defines a side on which the core is mounted, another surface side defines a side in which the grooves are formed, and the base plate includes through-holes that extend between one surface and the other surface of the base plate and connect to the grooves formed in the vicinity of the coil terminals.

11. A motor according to claim 10, wherein the lead wires are embedded in the grooves and guided by the through-holes from the other surface side to the one surface side of the base plate.

12. A motor according to claim 11, further comprising connection sections provided on the one surface side for electrically connecting the lead wires and the coil terminals.

13. A motor according to claim 12, wherein the core has a plurality of salient poles formed in a circumferential direction and protruding in a radial direction with each of the coils wound on each of the salient poles, and the connection sections are formed between adjacent ones of the salient poles.

14. A motor according to claim 9, wherein the lead wires are embedded in the grooves, and wherein the base plate has a lead wire guiding section on the outer side thereof, and the lead wire guiding section has second through-holes that connect to the grooves, and wherein resin films cover the lead wires, guiding grooves are formed continuously with the second through-holes in the lead wire guiding section on the one surface side of the base plate on which the core is mounted, each of the guiding grooves having a width smaller than an outer diameter of each of the resin films of the lead wires.

15. A motor according to claim 14, wherein the resin films on the lead wires are elastically deformed to fit in the guiding grooves.

* * * * *